3,153,567
METHOD OF MAKING DECABORANE REACTION PRODUCT WITH HYDRAZINES
Neil R. Fetter, Riverside, Calif., assignor to the United States of America as represented by the Secretary of the Navy
No Drawing. Filed Aug. 26, 1960, Ser. No. 52,311
8 Claims. (Cl. 23—14)
(Granted under Title 35, U.S. Code (1952), sec. 266)

The invention described herein may be manufactured and used by or for the Government of the United States of America for governmental purposes without the payment of any royalties thereon or therefor.

The present invention relates to a process for the synthesis of a new series of substances from the reaction of alkyldecaboranes and decaborane with several hydrazines and tetrazenes.

Prior to this invention there were no other methods known for preparing new substances from the reaction of decaboranes with hydrazines and tetrazenes.

It is, therefore, an object of this invention to provide a simple method for preparing new materials by the reaction of decaborane and substituted decaboranes with hydrazine, and tetra-substituted tetrazenes which may have use as solid rocket fuels, binders for such fuels, and components for explosives.

Another object of this invention is to provide a process for the preparation of reaction products of decaborane and hydrazine which have high heats of combustion and general physical characteristics suitable for propellant additives.

In accordance with the present invention a new series of materials may be prepared by the reaction of decaborane and substituted decaboranes with hydrazine, substituted hydrazines and tetra-substituted tetrazenes. The reaction is accomplished by adding the hydrazine or tetrazene directly to a cooled benzene solution of the decarborane, flowing inert atmosphere over the solution, slowly agitating the solution at 0° C. for about 30 minutes, and then at room temperature for at least another 15 minutes. The product separates from the benzene and its removal is effected by decantation. In all cases except the hydrazine-decaborane reaction all products were dried in a vacuum oven at room temperature for at least two hours. In the case of hydrazine and decaborane, the solid product appears to be somewhat sensitive at the final stages of drying because two batches exploded in the vacuum oven at room temperature, and the remainder was dried by allowing the benzene to evaporate in air at room temperature. The physical properties of the reaction products can be controlled to some extent by the molar ratio of the hydrazine to the decaborane, with the minimum ratio being 1:1 and the maximum being about 10:1. A ratio of less than 1:1 will leave unreacted decaborane and greater than 10:1 will, in most cases, have no effect on the product. The successful preparation further depends upon using an inert atmosphere such as nitrogen, employing an inert moderating solvent such as benzene, and/or maintaining the reaction medium close to 0° C.

The following examples serve to illustrate how the present invention may be carried out in practice; however, the invention is not restricted to the examples.

EXAMPLE I

*Decaborane and Hydrazine*

3.92 grams of decaborane are dissolved in approximately 100 ml. of benzene. The solution is placed in a flask with connections for a pressure equalizing dropping funnel and an inlet for nitrogen gas, and brought to near 0° C. with an ice bath. 2.72 grams of hydrazine together with 25 ml. of dry benzene are now dropped slowly into the flask. Nitrogen is allowed to flow slowly through the system and when air is removed the hydrazine is added dropwise slowly with constant stirring. During the course of the reaction which is about 20 minutes, a granular white solid precipitated from the solution. The precipitate was removed by decanting off as much of the solvent as possible and removing the remaining benzene by vacuum at room temperature. Elemental analyses have been performed and a compound with the empirical formula $B_{10}H_{21}N_6$ appears to agree fairly well with the analysis of the reaction product of decaborane and hydrazine.

EXAMPLE II

*Decaborane and Tetramethylhydrazine*

4.367 grams of decaborane are dissolved in approximately 25 ml. of benzene to which 3.276 grams of tetramethylhydrazine are added dropwise. After stirring for about 10 minutes at a reaction medium of close to 0° C., a viscous yellow fluid separates from the solution. The solvent is removed by vacuum evaporation at room temperature. The remaining precipitate is a slightly tacky yellow solid which bubbles and melts at 68–85° C., is a solid from 130–205° C. and melts at 205° C.

EXAMPLE III

*Decaborane and 1,2-Dimethylhydrazine*

2.737 grams of decaborane are dissolved in approximately 25 ml. of benzene and the mixture cooled to 0° C. 1,2-dimethylhydrazine is now added slowly dropwise with stirring. The mixture is stirred for about 20 minutes or until gas evolution stops. A gummy yellow material appears which is vacuum dried at room temperature. The product is a light yellow solid which undergoes very slight discoloration after one-half hour at 200° C. A compound with the empirical formula $B_{10}H_{20}C_2N_2$ appears to agree fairly well with the analysis of the reaction product of decaborane and 1,2 - dimethylhydrazine. The empirical formula could represent the unit $$[-B_{10}H_{12}\cdot(CH_3)NHNH(CH_3)-]$$

in a chain polymer.

EXAMPLE IV

*Decaborane and 1,1-Dimethylhydrazine*

Using the same procedure as in the previous examples, 2.066 grams of decaborane and 2.967 grams of 1,1-dimethylhydrazine are slowly mixed together for about 20 minutes at 0° C. until gas evolution stops. The product obtained is a gummy yellow material which starts bubbling at 85° C. and begins discoloring at 140° C.

EXAMPLE V

*Decaborane and 1,1-Diethylhydrazine*

2.00 grams of decaborane are dissolved in 30 ml. of benzene and 4.0 ml. of 1,1-diethylhydrazine are now added slowly with stirring at room temperature. After about 10 minutes a viscous yellow oil separated from the mixture. The solvent is now decanted off and the remaining solvent is removed by vacuum at room temperature leaving a tacky yellow plastic solid. The empirical formula $B_{10}H_{24}N_2C_4$ gives the closest agreement with the analysis of the decaborane-diethylhydrazine product and could also represent the unit $$[-B_{10}H_{12}\cdot(C_2H_5)_2NNH_2-]$$

in a polymer.

EXAMPLE VI

*Decaborane and 1,1-Di(n)-Propylhydrazine*

7.302 grams of decaborane are dissolved in 75 ml. of benzene and 7.104 grams of 1,1-di-(n)-propylhydrazine are now added slowly with stirring. During the reaction time of about 15 minutes a light yellow oil separated from the solution. The solvent is then removed by vacuum at room temperature leaving a viscous orange fluid.

EXAMPLE VII

*Decaborane and Methylhydrazine*

3.611 grams of decaborane are dissolved in 100 ml. of benzene and brought to 0° C. 2.459 grams of methylhydrazine are added slowly with stirring. The reaction proceeds for about 30 minutes producing a pale yellow granular precipitate. The product is now filtered out and vacuum dried. At 65° C. the product mildly explodes.

EXAMPLE VIII

*Decaborane and Tetramethyltetrazene*

4.37 grams of decaborane are added to 100 ml. of dry benzene. 3.28 grams of tetramethyltetrazene and 25 ml. of benzene are added dropwise with constant stirring. The solution is maintained near 0° C. and an inert atmosphere is allowed to flow through the system. At the end of about 30 minutes a yellow precipitate forms which is vacuum dried. The product when heated evolves hydrogen gas and at 200° C. is a dark yellow plastic material. The heat of combustion of the original material has been found to be 9600 cal./gram and that of the heated material to be 11,700 cal./gram.

Except for the compounds of decaborane and hydrazine and the powder form of the decaborane-methylhydrazine product, all the materials dried and stiffened as they aged. In most cases the material became so stiff and brittle that they could be easily ground into a powder. The stiffening process generally required as little as two days or as long as three months. Not only does the aging process affect the principal properties, but in almost every case the thermal stability improved with time. Although the chemical nature of aging is not presently known, the results of the examples herein disclosed show some of the striking changes which occur when a sample is heated fresh and after it has aged. The following table shows the wide ranges of initial stabilities that the three of these reaction products possess:

THERMAL STABILITIES OF HYDRAZINE-DECABORANE COMPOUNDS

| | Reactants | Appearance | Age, Days | Max. Temp., ° C. | Description |
|---|---|---|---|---|---|
| 1 | Decaborane-Hydrazine. | White powder. | 1 | 80 | Mild explosion at 80° C. |
| 2 | ....do.......... | ....do........ | 10 | 80 | Do. |
| 3 | Decaborane-Tetramethyltetrazene. | Yellow powder. | 2 | 200 | Bubbling and discoloration at 150° C. |
| 4 | ....do.......... | ....do........ | 42 | 227 | Slight discoloration up to 225° C. bubbling and melting at 225° C. |
| 5 | Decaborane-1,1-Dimethylhydrazine. | Pale yellow sticky plastic solid. | 4 | 200 | Bubbling started at 85° C. and discoloring at 140° C. |
| 6 | ....do.......... | ....do........ | 42 | 200 | Very slight discoloration after 2 hours at 200° C. |

Impact sensitivities have been determined for the compounds of decaborane and hydrazine, 1,2-dimethylhydrazine, 1,1-dimethylhydrazine, tetramethyltetrazene, 1,1-diethylhydrazine, and methylhydrazine. In all cases except the hydrazine-decaborane compound the impact sensitivities were all greater than 150 cm. and for the solid hydrazine-decaborane product the sensitivity was 40–50 cm. (low order) and for the liquid was 40–45 cm. (high-order detonation).

Elemental analyses have been performed on five of the sample products and the results are given below:

| | Compound | Percent B | Percent N | Percent C | Percent H |
|---|---|---|---|---|---|
| 1 | Decaborane-hydrazine | 34.19 | 24.55 | 1.96 | 10.60 |
| | $B_{10}H_{21}N_6$ (theor.) | 50.70 | 39.38 | | 9.92 |
| 2 | Decaborane-tetramethyl hydrazine | 59.86 | 10.09 | 19.57 | 10.48 |
| | $B_8H_{14}C_2N$ (theor.) | 62.41 | 10.17 | 17.32 | 10.10 |
| 3 | Decaborane-1,2-dimethyl hydrazine | 62.82 | 15.96 | 10.70 | 10.52 |
| | $B_{10}H_{20}N_2C_2$ (theor.) | 59.98 | 15.53 | 13.31 | 11.18 |
| 4 | Decaborane-1,1-diethyl hydrazine | 54.37 | 13.53 | 20.58 | 11.52 |
| | $B_{10}H_{24}N_2C_4$ | 51.91 | 13.44 | 23.05 | 11.60 |
| 5 | Decaborane-tetramethyltetrazene | 55.30 | 10.18 | 17.84 | 11.90 |
| | $B_{20}C_3H_{37}N_3$ | 57.43 | 11.15 | 19.13 | 12.29 |

In item 1 the percentages of B, N, C, and H do not equal 100. The discrepancy is probably the result of a poor boron analysis.

The purification of these compounds is difficult because they cannot be crystallized or distilled and they appear to be changing slowly. The elemental percentages which agree fairly closely with the experimental ones are given for some hypothetical complexes.

The alkyl hydrazines used in the reactions described herein were approximately 98–99% pure and the hydrazine contained about 5% water before distillation. The hydrazine, methylhydrazine, 1,1-dimethylhydrazine, 1,2-dimethylhydrazine, tetramethylhydrazine, 1,1-diethylhydrazine, and 1,1-di(n)propylhydrazine were vacuum distilled from calcium hydride before use. The benzene employed as a solvent was stored and distilled over $P_2O_5$ before use. The nitrogen used for inert atmosphere was taken directly from the tank.

Obviously many modifications and variations of the present invention are possible in the light of the above teachings. It is therefore to be understood that within the scope of the appended claims the invention may be practiced otherwise than as specifically described.

What is claimed is:

1. A method for the preparation of reaction products of decaborane with members of the class consisting of hydrazine, lower alkyl hydrazines and tetramethyltetrazene comprising the steps of dissolving decaborane in benzene, cooling the solution to about 0° C., providing an inert atmosphere over the solution, adding a member of the aforementioned class slowly with agitation while maintaining the temperature at about 0° C., and evaporating the excess reactant and solvent, whereby a solid residue is left.

2. A method for the preparation of a reaction product of decaborane and tetramethylhydrazine which comprises adding tetramethylhydrazine to a cooled benzene solution of decaborane at a reaction medium of 0° C. for about 10 minutes, which product is a tacky yellow solid with a melting point of 205° C.

3. A method for the preparation of a reaction product of decaborane and 1,2-dimethylhydrazine having the empirical formula $B_{10}H_{20}C_2N_2$ comprising adding 1,2-dimethylhydrazine to a cooled benzene solution of decaborane at a reaction medium of 0.° C. until gas evolution stops, which product is a light yellow solid undergoing only slight discoloration at 200° C.

4. The method for the preparation of a reaction product of decaborane and 1,1-dimethylhydrazine which comprises adding dimethylhydrazine to a cooled benzene solution of decaborane at a reaction medium of 0° C. and agitating until gas evolution stops, which product is a gummy yellow material with a melting point of 85° C.

5. A method for the preparation of a reaction product of decaborane and 1,1-diethylhydrazine having the empirical formula $B_{10}H_{24}N_2C_4$ which comprises adding 1,1-diethylhydrazine to a cooled benzene solution of decaborane and agitating for about 10 minutes at room temperature, which product is a tacky yellow solid.

6. A method for the preparation of a reaction product of decaborane and 1,1-di(n)propylhydrazine which comprises adding 1,1-di(n)propylhydrazine to a cooled benzene solution of decaborane and agitating for about 15 minutes, which product is a viscous orange fluid.

7. A method for the preparation of a reaction product of decaborane and methylhydrazine which comprises adding methylhydrazine to a cooled benzene solution of decaborane and agitating for about 30 minutes, which product is a pale yellow granular solid.

8. A method for the preparation of a reaction product of decaborane and tetramethyltetrazene, having the empirical formula, $B_{20}C_3H_{37}N_3$ which comprises adding tetramethyltetrazene to a cooled benzene solution of decaborane at a reaction medium of 0° C. for about 30 minutes, which product is a yellow powder.

References Cited in the file of this patent

Emeleus: Modern Aspects of Inorganic Chemistry, pages 273–281 (1958).

Steindler: "J. Am. Chem. Soc.," vol. 75, page 756 (1953).

Carpenter: "A.R.S. Journal," vol. 29, No. 1, pages 8, 10, and 11 (January 1959).